United States Patent [19]

Koog et al.

[11] Patent Number: 4,525,176

[45] Date of Patent: Jun. 25, 1985

[54] PREHEATING AND DESLAGGING A GASIFIER

[75] Inventors: Wolfgang Koog, Pleasantville, N.Y.; Lawrence E. Estabrook, Whittier, Calif.

[73] Assignee: Texaco Inc., White Plains, N.Y.

[21] Appl. No.: 527,611

[22] Filed: Aug. 29, 1983

[51] Int. Cl.$^3$ .............................................. C10J 3/08
[52] U.S. Cl. ............................... 48/197 R; 48/196 R; 48/203; 48/211; 48/DIG. 2; 252/373
[58] Field of Search .................... 239/1, 186, 187, 227; 48/DIG. 2, 197 R, 196 R, 76, 86 R, 87, 211, 212, 61, 62 R, 203; 422/156, 157, 158; 431/160; 252/373

[56] References Cited

U.S. PATENT DOCUMENTS

| | | | |
|---|---|---|---|
| 3,048,476 | 8/1962 | Dwyer | 252/373 |
| 3,100,461 | 8/1963 | Werner | 431/160 |
| 3,473,737 | 10/1969 | Bowman | 239/187 |
| 3,545,926 | 12/1970 | Schlinger et al. | 252/373 |
| 4,018,621 | 4/1977 | Jahnentz et al. | 48/DIG. 2 X |
| 4,073,627 | 2/1978 | Anderson | 48/62 R |
| 4,443,228 | 4/1984 | Schlinger | 48/86 R |

FOREIGN PATENT DOCUMENTS 387854  2/1933  United Kingdom ................ 48/203

Primary Examiner—Peter Kratz
Assistant Examiner—Joye L. Woodard
Attorney, Agent, or Firm—Robert A. Kulason; Albert Brent

[57] ABSTRACT

The refractory lined reaction zone of a free flow vertical gas generator for the production of raw synthesis gas, reducing gas, or fuel gas by the partial oxidation of an ash-containing solid carbonaceous fuel or a high-metal-containing liquid hydrocarbonaceous fuel is preheated and deslagged by first heating the slag and ash layer on the surface of the refractory lining to a temperature in the range of about 1800°–2000° F. by means of an annular-type elongated burner whose downstream tip is located near the upstream roof of the reaction zone. The tip of the burner is then lowered along the central longitudinal axis of the reaction chamber to above the bottom central outlet passage of the reaction chamber, and the slag and ash layer is heated to their melting point, or above. The molten slag at the bottom of the reaction chamber and the flue gas pass out through the bottom central outlet. The burner is then slowly raised vertically to the initial position while simultaneously melting successive portions of the slag and ash layer on the refractory walls. The molten slag flows down the walls and bottom of the reaction chamber and out through the bottom central outlet passage.

13 Claims, 1 Drawing Figure

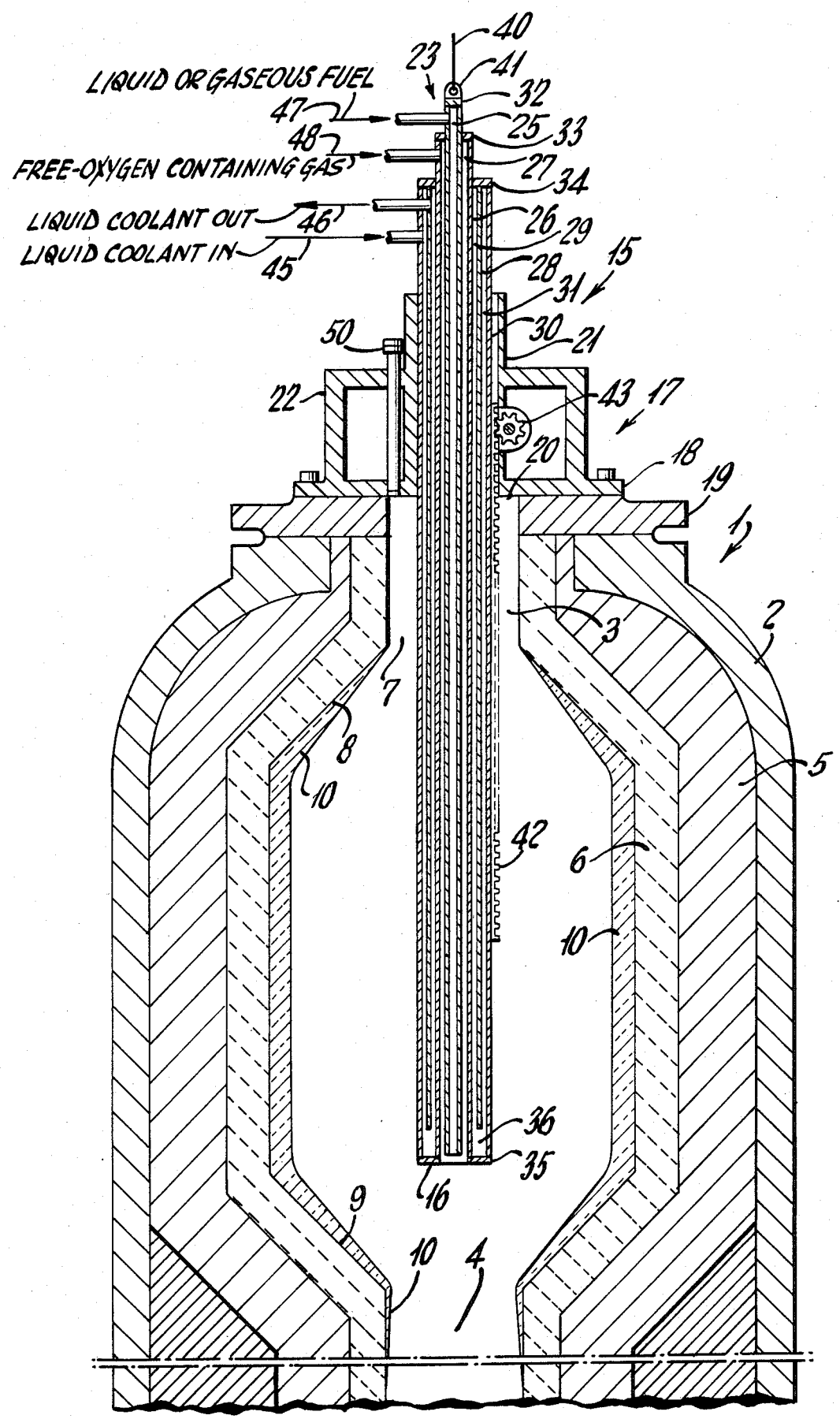

PREHEATING AND DESLAGGING A GASIFIER

BACKGROUND OF THE INVENTION

This invention relates to the operation of a gasifier. More particularly, it relates to a method and apparatus for preheating and deslagging a free-flow vertical gas generator for the production of raw synthesis gas, reducing gas, or fuel gas by the partial oxidation of an ash-containing solid carbonaceous fuel or a high-metal-containing liquid hydrocarbonaceous fuel.

Our future energy needs will be satisfied by increased amounts of the less desirable ash-containing solid carbonaceous fuels and heavy liquid hydrocarbonaceous fuels containing organo-metallic impurities. These comparatively low cost materials are attractive alternatives for light naphtha and natural gas which have risen substantially in price in recent years.

A free-flow vertical cylindrical steel pressure vessel lined on the inside with a thermal resistant refractory material is commonly used as the gasifier in the partial oxidation process for the production of raw synthesis gas, reducing gas, and fuel gas. Reference is made for example to coassigned U.S. Pat. Nos. 2,818,326; 4,218,423; and 4,312,637; which are incorporated herein by reference.

Ash-containing solid carbonaceous fuels e.g. coal, lignite, oil shale, tar sands; and liquid hydrocarbonaceous fuels containing a comparatively high amount of metal constituents have been used as fuel in the partial oxidation process for the production of synthesis gas, reducing gas, and fuel gas. Reference is made for example to coassigned U.S. Pat. Nos. 3,544,291; 3,976,442; and 3,996,026.

The hot raw gas stream leaving the reaction zone of the gas generator for the partial oxidation of ash-containing solid carbonaceous fuel or a high-metal containing liquid hydrocarbonaceous fuel contain entrained particulate matter e.g. ash, slag, char, and soot. The temperature of the raw effluent gas stream is in the range of about 1700° to 3000° F. When the gasifier is operated at a temperature above the ash and slag softening point e.g. above about 2200° F., a layer comprising portions of the slag and other entrained matter remains on the inside wall of the refractory after plant shutdown. This layer may cause considerable problems including thermal shock to the refractory at start-up due to low preheat temperatures, and blockage of the gas outlet at the bottom of the reaction zone, if the preheat temperature exceeds the ash fusion temperature.

These problems and others are avoided by the subject invention providing an improved method and apparatus for preheating and deslagging a partial oxidation gas generator.

SUMMARY OF THE INVENTION

This invention relates to a method and apparatus for preheating and deslagging the refractory lined chamber of a vertical free-flow partial oxidation gas generator having a top central inlet passage and a bottom central coaxial outlet passage. The refractory lining is first heated to a temperature in the range of about 1800°–2000° F. and below the softening temperature of the ash and slag layer on said refractory by burning a gaseous or liquid hydrocarbonaceous fuel in an elongated burner whose central longitudinal vertical axis is coaxial with that of the reaction zone of the gas generator. The initial position of the downstream tip of the burner is located at or near the downstream end of the central inlet passage. The gaseous products of combustion, e.g. flue gas are withdrawn through the bottom central outlet passage. After the entire refractory lined chamber has reached said temperature, the tip of the burner is then lowered to a position above the bottom central outlet passage. Burning of the fuel and oxidant is continued so as to increase the temperature of the ash an slag layer on the refractory walls of the bottom central outlet passage and on at least a portion of the refractory lined bottom of the reaction chamber to their melting point, or above. The molten slag and flue gas is passed out through the bottom central outlet passage. The burning and withdrawal of flue gas is continued while the burner is then slowly raised vertically upward along the central longitudinal axis of the reaction chamber until the tip of the burner reaches its initial position. The rate of burner withdrawal is such that simultaneously with the burner withdrawal, the temperature of successive portions of any remaining slag and ash layer on the refractory lined bottom of the reaction chamber and the slag and ash layer on the refractory walls of the reaction chamber is successively increased to their melting points, or above. The molten slag then flows down the walls, across the bottom, and passes out of the reaction chamber by way of said bottom central outlet passage.

BRIEF DESCRIPTION OF THE DRAWING

The invention will be further understood by reference to the accompanying drawing. The drawing includes a schematic representation of a suitable burner for use in the preheat deslagging process.

DESCRIPTION OF THE INVENTION

A more complete understanding of the invention may be had by reference to the accompanying schematic drawing which shows the subject invention in detail. Although the drawing illustrates a preferred embodiment of the invention, it is not intended to limit the subject invention to the particular apparatus or materials described.

The partial oxidation process for the production of synthesis gas, reducing gas, and fuel gas from low cost readily available ash-containing solid carbonaceous fuels and from liquid hydrocarbonaceous fuels containing naturally occurring heavy metal constituents with or without ash-containing recycle soot is described in coassigned U.S. Pat. Nos. 3,069,251; 3,544,291; 3,998,609; and 4,289,502 which are incorporated herein by reference.

The following ash-containing solid carbonaceous fuels are suitable feedstocks for the partial oxidation process and include by definition: coal i.e. anthracite, bituminous, subbituminous, or lignite; particulate carbon; coke from coal; petroleum coke; oil shale; tar sands; asphalt; pitch; and mixtures thereof. The following liquid hydrocarbonaceous fuels containing metal constituents are suitable feedstocks for the partial oxidation process and include by definition crude oil and heavy residua from the refining of petroleum, such as (1) vacuum residuum and the asphalt residuum from solvent deasphalting, and (2) the bottoms product from the hydrogenation and hydrocracking of residua or heavy crude oil.

The term free-oxygen containing gas, as used herein is intended to include air, oxygen-enriched air, i.e.

greater than 21 mole % oxygen, and substantially pure oxygen, i.e. greater than 95 mole % oxygen (the remainder comprising $N_2$ and rare gases).

In the partial oxidation process, solid carbonaceous fuel ground to a particle size of about 45 to 425 microns may be introduced into the gas generator either alone or in the presence of a substantially thermally vaporizable hydrocarbon and/or water, or entrained in a temperature moderator such as steam, $CO_2$, $N_2$ and recycle synthesis gas. The liquid hydrocarbonaceous fuel may be introduced into the gas generator entrained in steam or one of the other aforesaid temperature moderators. Reaction of the fuel and a free-oxygen containing gas takes place in the reaction zone of the gas generator at a temperature in the range of about 1700° to 3000° F. and a pressure in the range of about 1–250 atmospheres, such as about 5 to 200 atmospheres. The atoms of free-oxygen containing gas plus the atoms of organically combined oxygen in the solid carbonaceous fuel (O/C atomic ratio) may be in the range of about 0.7 to 1.6.

Depending upon the amount and composition of the feedstreams to the gas generator the hot raw effluent gas stream may have the following composition in mole % dry basis: $H_2$ 2 to 60, CO 8 to 70, $CO_2$ 1 to 50, $CH_4$ 0 to 2.0, $H_2S+COS$ 0 to 3, $N_2$ nil to 80, and A nil to 2.0. In addition, a particulate phase is present comprising ash, slag, and char and/or soot. Most of the particulate matter leaves the reaction zone entrained in the gas stream. The entrained particulate matter is then separated from the raw gas downstream from the gas generator. However, a small portion of the particulate matter forms a coating on the exposed surface of the refractory lining of the reaction chamber. Over a period of time, this coating may build up to a thickness of about $\frac{1}{4}''$ to $2''$, or more depending upon the type of fuel, ash content and composition, ash and slag fusion temperatures, and the operating conditions of the gasifier, e.g., temperature, O/C ratio prior to and at the time of shutdown.

By definition: Ash in the raw gas stream is the remnant of completely combusted particles of the fuel. The ash particles in the hot gas stream have not reached the melting temperature of the mineral matter originally contained in the fuel. These ash particles are typically less than 74 microns in size. Typical compositions of the ash particles in the gas stream from a coal feed for example in wt. % follow: $SiO_2$ 58.8–62.6; $Al_2O_3$ 15.8–20.0; $Fe_2O_3$ 3.3–5.1; $TiO_2$ 0.8–1.4; CaO 5.3–7.6; MgO 0.5–1.6; $Na_2O$ 0.2–0.4; $K_2O$ 0.4–0.7; $P_2O_3$ 0.1–0.3; and $SO_3$ 0.9–3.2. The composition of the ash produced from a metals containing liquid hydrocarbonaceous fuel substantially comprises a metal selected from the group consisting of Fe, Ni, V, Na, and mixtures thereof, and the metal sulfides and possibly oxides thereof. Slag is substantially molten ash or molten ash which has solidified into glassy particles. Slag particles are remnants of completely burnt fuel particles or slurry droplets and represent the fused mineral matter of the fuel feed. The content of mineral matter, e.g. ash in a typical solid carbonaceous fuel in weight percent may be about 0.2 for petroleum coke and 20.0 for coal. The ash content of liquid hydrocarbonaceous fuels in weight percent may vary from 0.04 for vacuum residue to 20.0 for H-coal vacuum residue. The size of coarse solid particles of slag is greater than about 841 microns; and the size of fine solid particles of slag is a fraction thereof. Char is the devolatilized and partially combusted solid carbonaceous fuel particles consisting mainly of ash. The remainder of the char e.g. about 2–65 wt. % comprises carbon, and a little, if any, of hydrogen and sulfur. Char particles are porous and the size is typically below 841 microns. The particles have not reached the melting temperature of the mineral matter originally contained in the solid carbonaceous fuel. The amount of char in the effluent gas stream may be decreased by increasing the temperature of the reaction zone. Soot is produced during the partial oxidation of a liquid hydrocarbonaceous fuel containing inorganic and organic compounds of iron, nickel and vanadium. Each of said metals may be present in the liquid fuel in the range of about 3.0 to 3300 parts per million (ppm) or higher. During partial oxidation of the liquid hydrocarbonaceous fuel, unconverted carbon sequesters these metals and the sulfides of these metals to produce soot.

Partial oxidation gas generator 1 as shown in the drawing, comprises a vertical free-flow cylindrically shaped steel pressure vessel 2 lined with refractory. There is no obstruction to the free-flow of the reaction products passing through the gas generator. Gas generator 1 is provided with a top central inlet passage 3 at the upper end and a bottom central outlet passage 4 at the lower end. To protect the gasifier vessel from high process temperatures, all vessel walls are provided with a multi-layer ceramic refractory internal insulation 5 and 6. The top central inlet passage 3 and bottom central outlet passage 4 are also refractory lined and are coaxial with the central longitudinal axis of the gas generator. The downstream end 7 of the top central inlet passage terminates at roof 8 or dome of the cylindrically shaped refractory faced reaction chamber. The internal shape of the roof of the reaction chamber may be dome-shaped of the hemispherical or diverging frusto-conical design, as shown in the drawing. While the refractory lining at the bottom 9 of the reaction chamber may be flat as shown in coassigned U.S. Pat. No. 2,818,326, for improved run-off of the molten slag, a hemispherical or a converging frusto-conical shaped design, such as shown in the drawing, is preferred. Slag and ash layer 10, which is removed by the subject invention, is shown on refractory walls 6, roof 8, and bottom central outlet passage 4.

A novel elongated water-jacketed pre-heat deslagging forced draft burner 15 may be used in the subject process. The burner is externally supported at the top of the gasifier with the downstream tip 16 of the burner passing down through upper central inlet passage 3, and with the central longitudinal axis of the burner and that of the gas generator being coaxial. Supporting structure 17 for burner 15 is provided with a flange plate base 18 which is secured to top flange 19 of the gasifier, and which covers the entrance 20 to top central inlet passage 3. Supporting structure 17 also includes vertical cylindrical sleeve 21 which slidably supports the burner in a vertical position, and which permits the burner to be freely moved up or down. Sleeve 21 is secured to base plate 18 and is further supported in an upright position by hat-shape housing 22 which in turn is secured to base plate 18. Conventional o-ring seals and bearings (not shown) may optionally be used for providing an air-tight seal while allowing the burner to move longitudinally.

The overall length of the pre-heat/deslagging burner is unusual. At its maximum insertion in the gasifier, about $\frac{1}{4}$ to $\frac{1}{3}$ of the length of the burner constitutes the upstream portion 23 that may extend above the gasifier. The remainder of the burner will then pass down through the entire length of the refractory lined reaction zone until tip 16 of the burner is about 0–3 ft. above the bottom outlet.

Pre-heat/deslagging burner 15 is an annular type burner comprising central cylindrical conduit 25 through which one reactant is passed; a coaxial radially spaced second cylindrical conduit 26 surrounding central conduit 25 along its length and providing a first annular passage 27 therebetween through which a second reactant is passed, a radially spaced coaxial third cylindrical conduit 28 surrounding said second conduit along its length and providing a second annular passage 29 therebetween through which a coolant is discharged, and a radially spaced coaxial outer cylindrical conduit 30 surrounding said third conduit along its length and providing a third annular passage 31 therebetween through which a coolant may be introduced. Central and second conduits 25 and 26 are closed at thier upstream ends by plates 32 and 33, respectively and open at thier downstream ends. Second and third annular passages 29 and 31 are closed at thier upstream ends by plate 34. The burner is jacketed by joining the downstream ends of second and outer conduits 26 and 30 with annular plate 35. Third conduit 28 is retracted upstream from the downstream tip of the burner to provide ring shaped passage 36 for the flow of the coolant between the third and second annular passages 31 and 29, respectively. The preferred burner coolant is water. However, free-oxygen containing gas may be the coolant. In such case the free-oxygen containing gas may be preheated prior to being passed through the burner as the oxidant for the combustion reaction in the gas generator.

By attaching a cable or chain 40 to lug 41 at the upstream end 23 of burner 1, a conventional hand or motor driven hoist (not shown) may be used to install or remove the burner from gas generator 1. Further, once installed, the hoist may be used to move the burner up and down during operation. Alternatively, burner 15 may be raised or lowered by means of rack 42 attached lengthwise along the outside surface of the burner, and mating motor or hand driven pinion gear 43.

The suggested gross heat release of the burner may be about 7MM BTU/hr. for a 200 ft$^3$ gasifier and 17MM BTU/hr. for a 1000 ft$^3$ gasifier.

Preheating and deslagging the refractory walls and bottom central outlet of the partial oxidation gas generator is effected by passing the downstream end of preheat/deslagging burner 1 through the top central inlet passage 3 until the tip 16 of the burner is located at or near the downstream end 7 of central inlet passage 3. This is the initial position of the burner. For example, the tip of the burner may be retracted upstream from the downstream end of the central inlet passage a distance in the range of about 0 to 6 inches. Bottom flange 18 of structural support 17 for the burner is clamped to top flange 19 of the gasifier. The entrance to the top central inlet passage may be thereby sealed, and the amount of secondary air from the atmosphere that can be drawn through top central inlet 20 of the gasifier may be controlled or substantially eliminated. This will prevent the slag and ash layer above the burner tip from being cooled by secondary air.

Cooling water, for example in line 45 is passed through the third and second annular passages of the water jacketed burner. The warm water leaves the burner through line 46. A liquid or gaseous hydrocarbon fuel in line 47 is then passed through the central conduit 25, or alternatively through first annular passage 27. Suitable gaseous fuels include, hydrogen, natural gas, coke-oven gas, acetylene off gas, refinery gas, propane, or gaseous mixtures of $H_2$ and CO made by the partial oxidation process. Suitable liquid hydrocarbon fuels, which may be in admixture with steam, include liquefied petroleum gas and light fuel oil. A free-oxygen containing gas, such as air in line 48, is then passed through the first annular passage 27, or alternatively through central conduit 25, whichever is free. The ratio of the flow rates for the fuel and free-oxygen provide combustion with excess oxygen. For example, with a gas fuel, the air feed rate may be kept 50% above the stoichiometric requirements. The fuel and oxidant streams may be introduced into the reaction zone at a temperature in the range of about ambient to 600° F. The pressure in the reaction zone may be in the range of about a few inches of water column vacuum to about 1–2 atmospheres.

The fuel may be ignited by manual or automatic light-off or by the heat from the refractory when the temperature is high enough. Optionally, burner 15 may be lit before downstream end 6 is passed through central inlet passage 3. Complete combustion takes place in the reaction zone. There should be no soot in the flame. A sooty flame is fuel-rich and indicates that more air is required. The products of combustion pass down through bottom central outlet passage 4 and are discharged from the system. When a downstream steam ejector or aspirator (not shown) is used to draw a vacuum in the reaction zone, the flue gases are first cooled by quenching in water or in a gas cooler, mixed with the steam in the ejector, and then separated from water prior to venting. Preheating of the gas generator is continued at a rate in the range of about 50° to 200° F. per hour, such as less than about 100° F. per hour, until the slag and ash coating on the surface of the refractory lining of reaction chamber and bottom outlet reaches a temperature in the range of about 1800° to 2000° F. and below the slag and ash softening temperatures. The temperature in the reaction zone may be measured by conventional thermocouples or by means of an optical pyrometer. Sight glass 50 is provided with quartz lenses for viewing the inside of the reaction chamber.

The slag and ash layer on the refractory lining of the central bottom outlet passage and on at least a portion of the refractory lined bottom of the reaction zone are first removed by lowering the burner into the reaction zone, along the central longitudinal axis, until the downstream tip is located about 0 to 3 feet above the bottom central outlet. The burning is continued and the temperature of said slag and ash layer is increased to the slag and ash melting point, or about 10°–200° F. above. The slag melts at a temperature in the range of about 2200°–2700° F. The molten slag and the flue gas flow through the bottom central outlet passage. If necessary, additional fuel and free-oxygen containing gas may be supplied to the burner in order to obtain higher temperatures. Further, the burner flame should preferably be a blue color, rather than yellow and sooty.

The burning and withdrawal of flue gas is continued while the burner is slowly raised upward along the central vertical axis of the reaction chamber. Simultaneously, the temperature of successive portions of any remaining slag and ash layer on the refractory lined bottom of the reaction chamber and the slag and ash layer on the refractory walls of the reaction chamber is increased to their melting point, or about 10°–200° F. above. For example, the temperature increase of the slag and ash layer may be at a rate of about 50°–200° F. per hour, such as less than 100° F. As the burner is withdrawn upward until the initial position is reached, successive portions of the slag and ash layer on the walls become exposed to the hot flame and melt. The molten slag runs down the walls, across the bottom of the reaction chamber, and leaves the reaction chamber of the gas generator through the bottom central outlet passage.

Disposal of the molten slag, once it passes through the bottom central outlet passage is beyond the scope of this invention. However, the molten slag may for example, leave from the bottom central outlet and drop into a quench tank containing water, or into a slag pot. The slag may be then recovered and used for example as land fill.

Although modifications and variations of the invention may be made without departing from the spirit and scope thereof, only such limitations should be imposed as are indicated in the appended claims.

We claim:

1. A process for preheating and deslagging the refractory lined reaction chamber of a vertical free-flow partial oxidation gas generator having a top central inlet passage that terminates at the roof of the reaction chamber, and wherein said reaction chamber has a refractory lined bottom central coaxial outlet passage comprising:

(1) heating the slag and ash layer on the surface of the refractory lining of said reaction chamber to a temperature in the range of about 1800°–2000° F. by burning a fuel and a free-oxygen containing gas in an elongated burner whose central longitudinal vertical axis is coaxial with that of the gas generator, said burner being supported externally from said reaction chamber and having a downstream end that passes down through said top central inlet passage so that at its initial position the tip of the burner is located at or near the downstream end of the top central inlet passage, and withdrawing the gaseous products of combustion through said bottom central outlet passage while controlling or substantially eliminating the amount of secondary air from the atmosphere that can be drawn through said top central inlet passage;

(2) removing the slag and ash layer from the refractory walls of the bottom central outlet passage and from at least a portion of the refractory lined bottom of the reaction chamber by lowering said burner into the reaction chamber until the tip of the burner is located above the bottom central outlet passage, continuing said burning so as to increase the temperature of said slag and ash layer to their melting point, or above, at a rate of about 50° to 200° F. per hour, and passing the molten slag and flue gas out through the bottom central outlet passage; and then (3) continuing said burning and withdrawal of flue gas while slowly raising the burner vertically along the central longitudinal axis of the reaction chamber until the tip of the burner reaches said initial position in the top central inlet passage while simultaneously increasing the temperature of successive portions of any remaining slag and ash layer on the refractory lined bottom of the reaction chamber and the slag and ash layer on the refractory walls of the reaction chamber to their melting point, or above, at a rate of about 50° to 200° F. per hour, and flowing the molten slag down the walls and bottom of the reaction chamber and out through said bottom central outlet passage.

2. The process of claim 1 where in (1) the slag and ash layer is heated to a temperature below the slag and ash melting point.

3. The process of claim 1 wherein the slag and ash layer in (2) and (3) is heated to a temperature in the range of about 2200° to 2700° F.

4. The process of claim 1 where the temperature of the slag and ash layer in (2) and (3) is increased at a rate of less than 100° F. per hour.

5. The process of claim 1 wherein the gaseous products of combustion are cooled by heat exchange with water directly in a quench tank and/or indirectly in a gas cooler.

6. The process of claim 1 wherein said fuel is a liquid or gaseous hydrocarbonaceous fuel, or hydrogen.

7. The process of claim 6 wherein said fuel is a gaseous hydrocarbonaceous fuel selected from the group consisting of natural gas, coke-oven gas, acetylene, off-gas from a chemical process, synthesis gas, and propane.

8. The process of claim 6 wherein said fuel is a liquid hydrocarbonaceous fuel selected from the group consisting of liquefied natural gas, and petroleum distillates and residues.

9. The process of claim 1 wherein said free-oxygen containing gas is selected from the group consisting of air, oxygen-enriched air, i.e. greater than 21 mole % $O_2$, and substantially pure oxygen i.e. greater than 95 mole % $O_2$.

10. The process of claim 1 wherein said burner is externally supported on the upper end of said gas generator which is provided with a top flange and a coaxial upper central inlet passage that discharges downward into a coaxial reaction chamber having a coaxial bottom central outlet passage and said burner passes down through said central inlet passage, said burner comprising a central cylindrical conduit through which one reactant comprising a gaseous or liquid hydrocarbon fuel or a free-oxygen containing gas is passed; a coaxial radially spaced second cylindrical conduit surrounding said central conduit along its length and providing a first annular passage therebetween through which a second reactant is passed comprising a gaseous or liquid hydrocarbon fuel or a free-oxygen containing gas and which reactant is not passed through said central conduit; a radially spaced coaxial third cylindrical conduit surrounding said second conduit along its length and providing a second annular passage therebetween through which a coolant is discharged near its upper end; a radially spaced coaxial outer cylindrical conduit surrounding said third conduit along its length and providing a third annular passage therebetween through which a coolant may be introduced near its upper end; means for connecting together the downstream ends of said second and outer conduits to produce a coolant jacket; means attached to said burner for raising and lowering the downstream end of the burner over the full length of the reaction chamber and along its central longitudinal axis; and wherein the central and second conduits are closed at their upstream ends and open at their downstream ends, the third and outer conduits are closed at their upstream ends, and the third conduit is retracted upstream from the downstream tip of the burner to provide a passage for the flow of the coolant between the third and second annular passages; and wherein said burner is provided with a support structure located above the top of the gas generator and comprising a base plate for clamping to the top flange of the gas generator thereby sealing off the entrance to the central inlet passage, a coaxial hat-shape housing extending upwardly from said base plate, and a cylindrical shaped sleeve for slidably holding the burner in vertical alignment with the central longitudinal axis of the reaction chamber, said sleeve being held in a vertical position by said hat-shape housing and said base plate.

11. The process of claim 10 wherein said coolant is water.

12. The process of claim 10 wherein said coolant is free-oxygen containing gas, and said free-oxygen containing gas is thereby preheated prior to combustion with said fuel.

13. The process of claim 1 wherein the bottom of said reaction chamber is hemispherical or converging frusto-conical.

* * * * *